US008593516B2

(12) United States Patent
Donauer et al.

(10) Patent No.: US 8,593,516 B2
(45) Date of Patent: Nov. 26, 2013

(54) METHOD FOR DETERMINING THE DISTANCE BETWEEN TWO EXTERNAL STORES ON AN AIRCRAFT OR AERIAL VEHICLE DURING THE SEPARATION OF ONE OF THE EXTERNAL STORES

(75) Inventors: Stefan Donauer, Geretsried (DE); Ronald Deslandes, Unterhaching (DE)

(73) Assignee: EADS Deutschland GmbH, Munich (DE)

(*) Notice: Subject to any disclaimer, the term of this patent is extended or adjusted under 35 U.S.C. 154(b) by 1406 days.

(21) Appl. No.: 12/234,319

(22) Filed: Sep. 19, 2008

(65) Prior Publication Data
US 2009/0096868 A1    Apr. 16, 2009

(30) Foreign Application Priority Data
Sep. 21, 2007    (DE) .................... 10 2007 045 205

(51) Int. Cl.
*H04N 9/47*    (2006.01)
*H04N 7/18*    (2006.01)
(52) U.S. Cl.
USPC ........................................................ 348/142

(58) Field of Classification Search
USPC ........ 348/142; 89/1.59, 1.6; 244/137.4, 118.2
See application file for complete search history.

(56) References Cited

U.S. PATENT DOCUMENTS

| 4,422,041 A | 12/1983 | Lienau |
| 4,589,615 A * | 5/1986 | Walker, Jr. ................. 244/137.4 |
| 4,642,786 A * | 2/1987 | Hansen .......................... 702/153 |
| 4,982,188 A * | 1/1991 | Fodale et al. ............ 340/870.28 |
| 5,172,056 A * | 12/1992 | Voisin ...................... 324/207.17 |
| 5,173,945 A | 12/1992 | Pieters et al. |
| 5,904,323 A * | 5/1999 | Jakubowski et al. ...... 244/137.4 |
| 2005/0204910 A1 * | 9/2005 | Padan .......................... 89/1.813 |

OTHER PUBLICATIONS

A New perspective on Magnetic field sensing by Caruso et al. 1998.*

* cited by examiner

*Primary Examiner* — Frantz Jean
(74) *Attorney, Agent, or Firm* — Greenblum & Bernstein, P.L.C.

(57) ABSTRACT

Method for determining a distance between two external stores on an aircraft or aerial vehicle and aircraft with at least two external stores. The method includes separating one of the two stores from the aircraft or aerial vehicle in flight, and determining a chronological course of a distance during the separation operation with at least one magnetic field sensor.

19 Claims, 4 Drawing Sheets

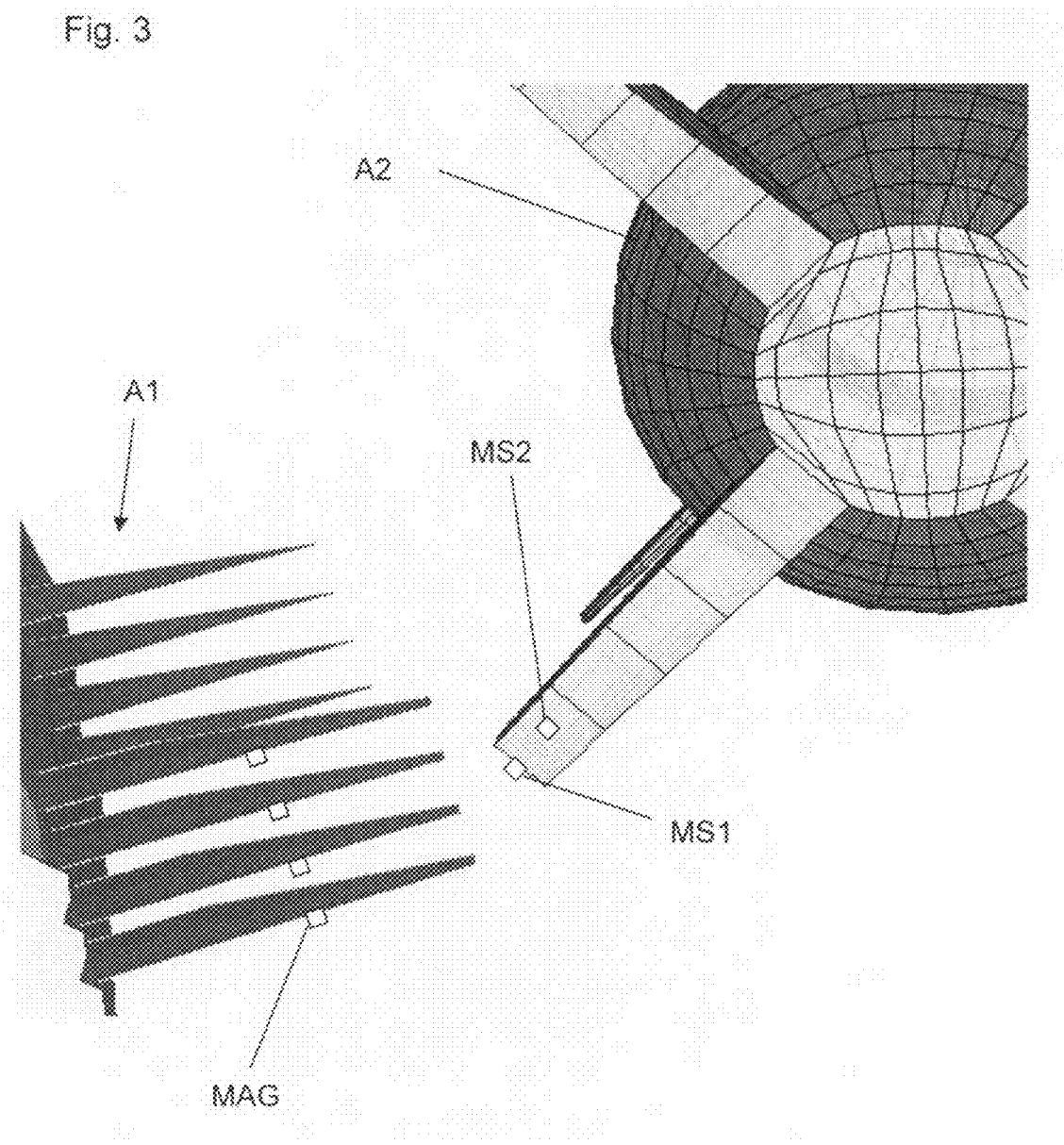

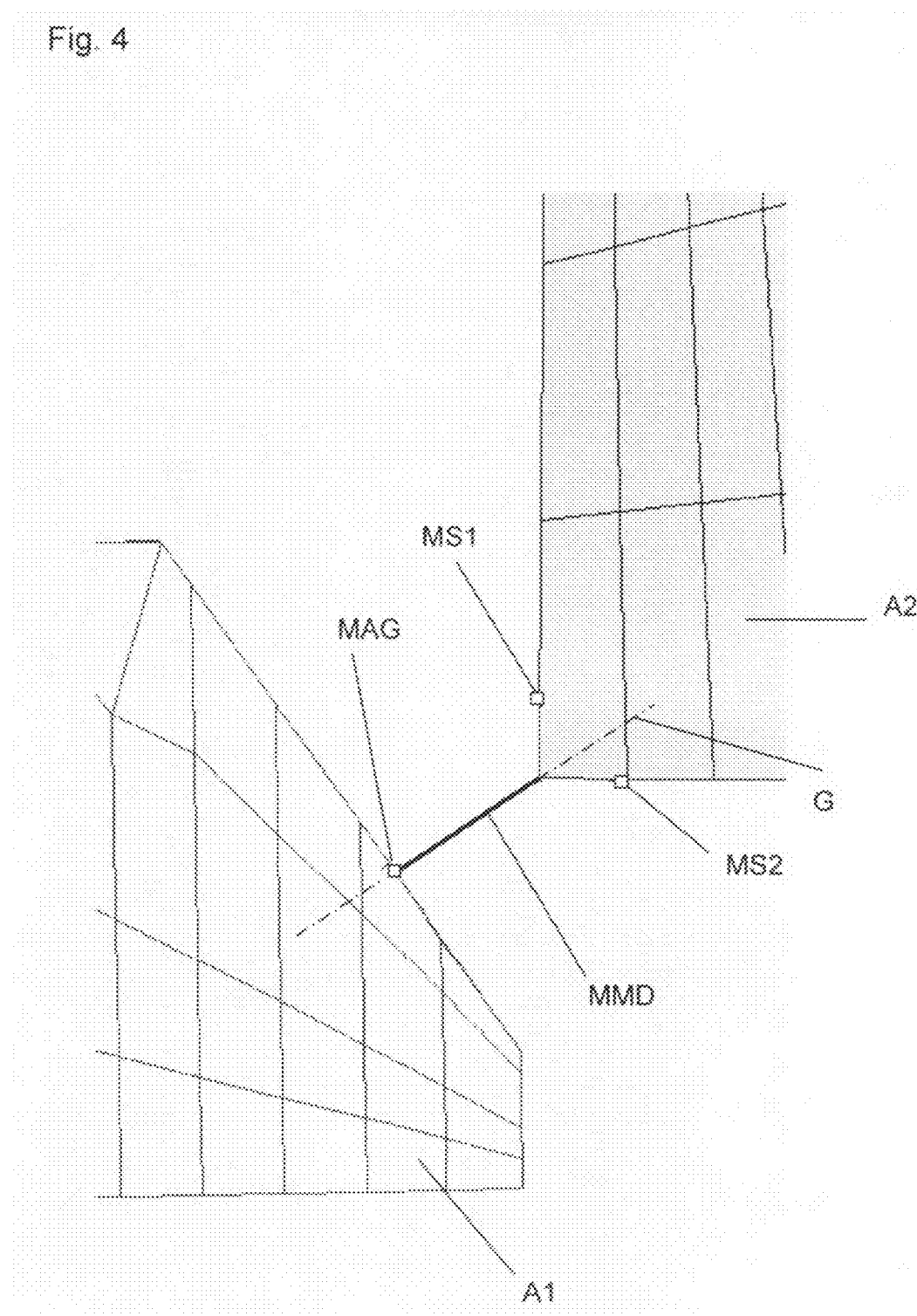

METHOD FOR DETERMINING THE DISTANCE BETWEEN TWO EXTERNAL STORES ON AN AIRCRAFT OR AERIAL VEHICLE DURING THE SEPARATION OF ONE OF THE EXTERNAL STORES

CROSS-REFERENCE TO RELATED APPLICATIONS

The present application claims priority under 35 U.S.C. §119 of German Patent Application No. 10 2007 045 205.7 filed Sep. 21, 2007, the disclosure of which is expressly incorporated by reference herein in its entirety.

BACKGROUND OF THE INVENTION

1. Field of the Invention

The invention relates to a method for determining the distance between two stores on an aircraft or aerial vehicle during the separation of one of the two stores. The two stores may be external stores or may be internal stores.

2. Discussion of Background Information

With modern fighter aircraft, external stores (in particular guided missiles, rockets, bombs) are typically arranged very close to one another. In order to ensure safe separation of an external store, certain minimum distances (in the range of >2 inches) from other external stores on the vehicle must be maintained during the entire separation. The maintenance of these minimum distances must be verified in flight tests.

The determination of distance is usually carried out with the aid of video recordings. However, the knowledge of the precise time for the occurrence of the smallest distance, minimum miss distance (MMD), is indispensable for the correct evaluation of the recordings. This is necessary because the camera is subject to a distortion in perspective and thus a sufficiently precise assignment of the MMD time is often not possible.

SUMMARY OF THE INVENTION

Embodiments of the invention provide a method for determining distance that can be installed with only low expenditure and that, moreover, generates only low aerodynamic interference.

Embodiments of the present invention are directed to a method in which a chronological course of the distance during a separation operation is determined using one or more magnetic field sensors.

According to embodiments of the invention, one or more magnetic field sensors can be used to measure distance. The magnetic field sensor is preferably attached to the adjacent external store that is stationary during separation. One or more magnets are arranged on the external store itself that is to be separated. The precision can be increased through the use of several sensors.

A commercially available sensor (e.g., Philipps Semiconductor KMZ Series) can be used as a magnetic field sensor. This is thereby preferably a passive sensor.

The field strength measured by the sensor is recorded chronologically. Based on a corresponding calibration, in addition to the time of the MMD, the MMD itself can also be directly determined from the sensor signal.

In alternative embodiments, initially only the time of the maximum field strength is determined from the sensor signal. This corresponds to the time of the maximum proximity. This information is then used for the selection of the associated video frame from the camera recording of the store separation. The MMD can then be determined from this camera image.

The method according to the invention can be used on a manned aircraft as well as on an unmanned aerial vehicle (drones, UAV=unmanned aerial vehicle).

In accordance with embodiments of the instant invention, a magnetic field sensor can be used to achieve considerable advantages, such as:

Due to small dimensions of the sensors, the aerodynamic interference that influences the separation behavior or the overall aerodynamic characteristics of the aerial vehicle is only small.

No mechanical parts are present that could induce flutter problems or vibration problems and that could render the measuring signal unusable.

No electronic bounce effects are to be anticipated.

A substantially easier installation is made possible under Flight Test Instrumentation (FTI) aspects.

Embodiments of the invention are directed to a method for determining a distance between two external stores on an aircraft or aerial vehicle. The method includes separating one of the two external stores from the aircraft or aerial vehicle, and determining a chronological course of a distance during separation with at least one magnetic field sensor.

According to features of the embodiments, the at least one magnetic field sensor may be located on a stationary external store of the two external stores that is not separated, and at least one magnet may be arranged on the one of the two external stores, which is intended to be released.

In accordance with other features of the embodiments, based upon a calibration, the method can further include directly determining a minimum distance via the electrical signal from the at least one magnetic field sensor.

Embodiments of the method can also include determining a time of a minimum distance from a signal of the at least one magnetic field sensor. Further, the method can include recording the store release with a camera, selecting an associated camera image based upon a value obtained with the at least one magnetic field sensor for the time of the minimum distance, and determining the minimum distance from the camera image.

Embodiments of the invention are directed to an aircraft that includes at least two external stores connected to fuselage or wings, at least one of the at least two external stores is separable from the fuselage or wings, and at least one magnetic field sensor structured and arranged to determine a distance between the at least two external stores.

In accordance with features of the embodiments, in a release, the one of the at least two external stores may separate from the underside of the fuselage or wings, and the at least one magnetic field sensor may be structured and arranged to determine a chronological course (time history) of the distance during the separation.

According to other features of the embodiments, at least one magnet can be located on the one of the at least two external stores. Further, the at least one magnetic field sensor may be located on an other of the at least two external stores.

In accordance with still other features, the at least one magnetic field sensor may be structured and arranged to determine a minimum distance between the at least two external stores throughout the release.

Moreover, embodiments can include a timing unit structured and arranged to determine a time at which a minimum distance is achieved during the release. Further, a camera can be structured and arranged to record the separation. Also, a device for correlating successive images from the camera image with the timing unit may be included. The correlating device can be structured and arranged to identify a camera image captured at the time at which the minimum distance is achieved. The minimum distance may be determinable from the camera image captured at the time at which the minimum distance is achieved.

Embodiments of the invention are directed to a method for determining a minimum distance between at least two external stores located on a fuselage or wings of an aircraft. The method includes positioning at least one magnetic field sensor to monitor a distance between the at least two external stores, and separating one of the at least two external stores from the fuselage or wings in a separation operation, such that the one of the at least two external stores moves relative to an other of the at least two external stores. The method also includes determining with the at least one magnetic field sensor a minimum distance occurring between the one external store and the other external store during the separation.

Further, the determining can include monitoring a chronological course (time history) of the distance during the separation operation.

In accordance with still yet other features of the embodiments, the method can include positioning at least one magnet on the one of the external stores. The positioning of the at least one magnetic field sensor may include locating the at least one magnetic field sensor on the other external store. Further, the method may include directing a camera at a location at which the minimum distance is anticipated, recording images of the location at which the minimum distance is anticipated, and identifying an image recorded at a time at which the magnetic field sensor determines the occurrence of the minimum distance.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 3 illustrates, in an enlarged scale, the area depicted in FIG. 1 where the two external stores come closest to one another; and FIG. 4 illustrates, in an enlarged scale, the area depicted in FIG. 2 where the two external stores come closest to one another.

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
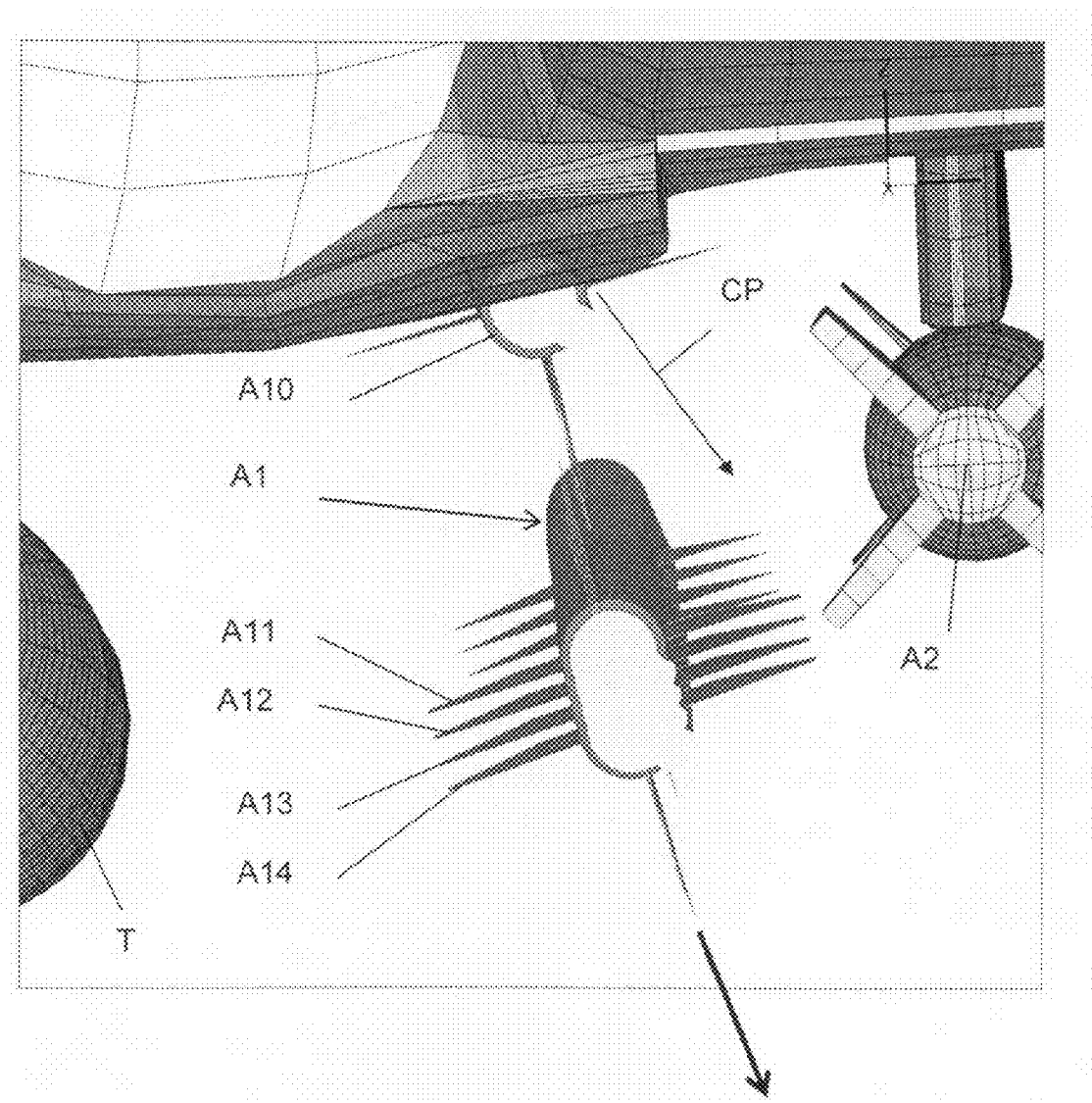
FIG. 1 illustrates a rear view of a fighter aircraft (i.e., line of sight from the rear parallel to an aircraft longitudinal axis) with several external stores on an underside of a fighter aircraft.

FIG. 1 shows an underside of an aircraft, e.g., a fighter aircraft, on which two external stores A1 and A2 are arranged relatively closely adjacent to one another. External store A1 can be, e.g., an air-to-air missile, while external store A2 can be a bomb. As shown in the exemplary illustration, external store A1 has been separated from the aircraft in the direction of indicated by the arrow. External store T remains installed on the aircraft. However, it is also noted that embodiments of the invention are contemplated utilizing internal stores and internal store separation without departing from the spirit and scope of the embodiments.

Figure 2:
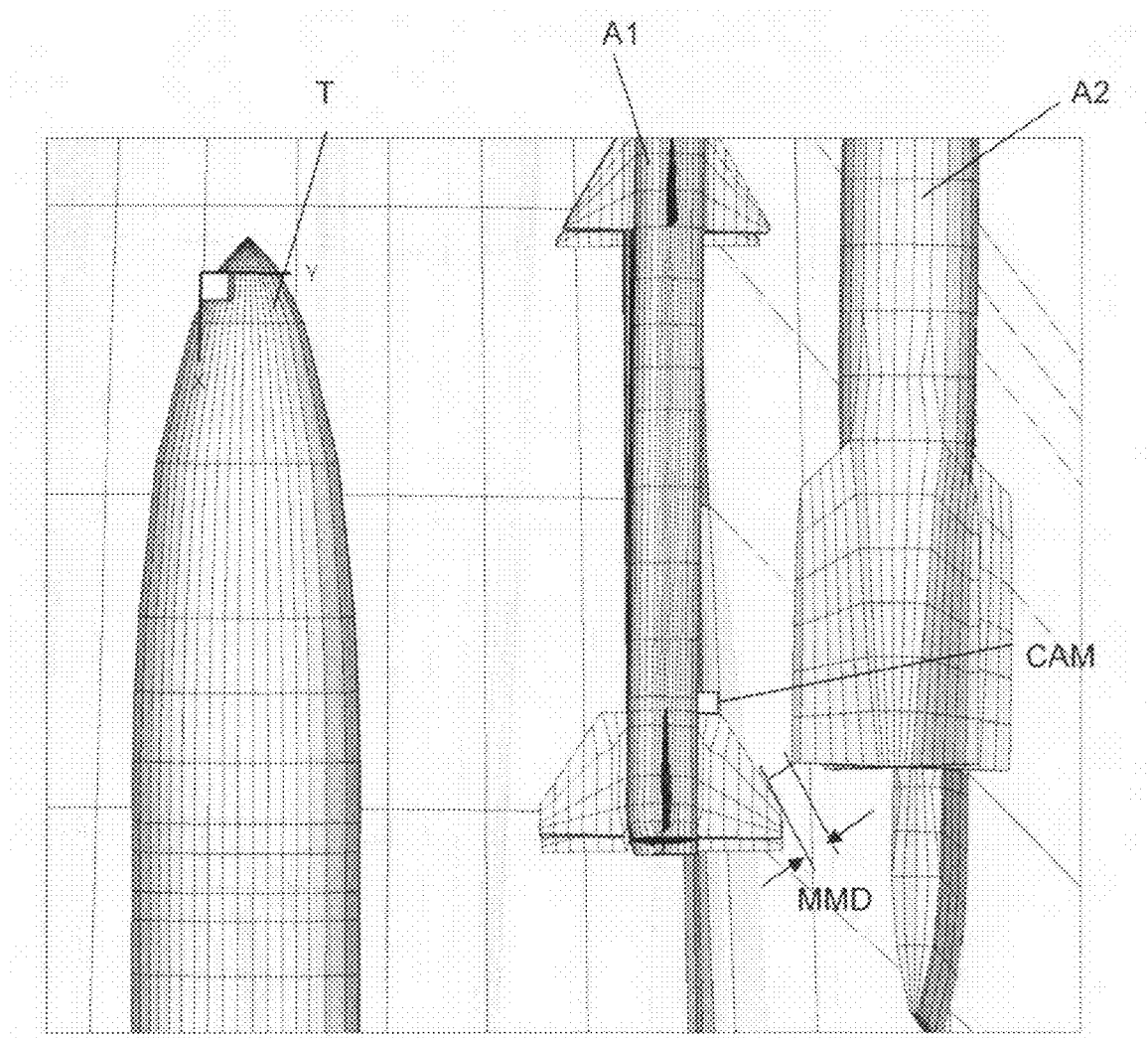
FIG. 2 illustrates the fighter aircraft depicted in FIG. 1, albeit not to the same scale, viewed from below (i.e., line of sight parallel to the aircraft vertical lift axis)

FIG. 1 also illustrates external store A1 in its initial installation position A10 near to the aircraft fuselage as well as also in four instantaneous exposures A11, A12, A13, A14, as it separates from the aircraft and in which it comes closest to external store A2. In the exemplary embodiment, external store A2 does not change its position during the separation operation of external store A1. Further, a minimum distance MMD between external stores A1 and A2 is illustrated in FIG. 2.

Magnetic field sensors and magnets are generally arranged at geometric locations on adjacent external stores A1 and A2, at which the occurrence of the MMD is to be anticipated. As illustrated in FIGS. 3 and 4, passive magnetic field sensors MS1 and MS2 are arranged on a lateral edge and a trailing edge of a wing or fin of external store A2 for taking distance measurements. A small magnet MAG having dimensions in the millimeter range (e.g., edge lengths 2×4×6 mm) is arranged on a leading edge of a wing of separated external store A1. Since sensors MS1 and MS2 can be embodied or formed to be very small (e.g., with edge lengths 2×5×5 mm), aerodynamic interference will remain very low. The two sensors MS1 and MS2 are advantageously arranged symmetrically at a right angle to a straight line G that is fixed by a connection line of the two external stores A1 and A2 that is anticipated during the occurrence of the MMD. Moreover, magnet MAG lies on straight line G.

In an unillustrated embodiment with one magnet and one magnetic field sensor, the magnet and magnetic field sensor can preferably be attached respectively at the geometrical locations of the external stores at which the occurrence of the MMD is to be anticipated (preferably on straight line G depicted in FIG. 4).

In a further variant, several magnets can be used (either together with one or with several magnetic field sensors) to generate a larger spatial extension of the magnetic field. The magnets can thereby be arranged, e.g., one behind the other on straight line G depicted in FIG. 4, while the magnetic field sensors lie symmetrically to straight line G or, in the case of only one magnetic field sensor, on straight line G.

With known positions of magnetic field sensors MS1 and MS2 and magnet MAG, both the time of the MMD as well as the MMD itself can be determined from the signals of magnetic field sensors MS1 and MS2.

In addition, a camera CAM (see FIG. 2) with line of sight CP (see FIG. 1) can be present in order to observe the separation of external store A1 from the aircraft. Line of sight CP can be directed at the area at which the MMD is to be expected. With the time of the MMD determined by magnetic field sensors MS1 and MS2, the value of the MMD can be determined from the associated camera image.

Further, embodiments of the invention are contemplated for measuring distances and/or gap sizes that are inaccessible to other tools. Moreover, it is understood that the distances and/or gap sizes can be located or arranged on land vehicles, grounded items, etc.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for determining a distance between two stores on an aircraft or aerial vehicle, comprising:
    separating one of the two stores from the aircraft or aerial vehicle; and
    determining a chronological course of a distance between the two stores during the separating of the one store with at least one magnetic field sensor.

2. The method in accordance with claim 1, wherein the at least one magnetic field sensor is located on a stationary store of the two stores that is not separated, and at least one magnet is arranged on the one of the two stores, and
    wherein the two stores comprise external stores.

3. The method in accordance with claim 1, wherein, based upon a calibration, the method further comprises directly determining a minimum distance from a signal from the at least one magnetic field sensor.

4. The method in accordance with claim 1, further comprising determining a time of a minimum distance from a signal of the at least one magnetic field sensor.

5. The method in accordance with claim 4, further comprising recording the store release with a camera;
    selecting an associated camera image based upon a value obtained with the at least one magnetic field sensor for the time of the minimum distance; and
    determining the minimum distance from the camera image.

6. An aircraft, comprising:
    at least two stores connected to a fuselage or wings;
    at least one of the at least two stores is separable from the fuselage or wings; and
    at least one magnetic field sensor structured and arranged to determine a chronological course of a distance between the at least two stores during a separation of the one of the at least two stores from the fuselage or wings.

7. The aircraft in accordance with claim 6, further comprising at least one magnet located on the one of the at least two stores.

8. The aircraft in accordance with claim 7, wherein the at least one magnetic field sensor is located on an other of the at least two stores.

9. The aircraft in accordance with claim 6, wherein the at least one magnetic field sensor is structured and arranged to determine a minimum distance between the at least two stores throughout the separation.

10. The aircraft in accordance with claim 6, further comprising a timing unit structured and arranged to determine a time at which a minimum distance is achieved during the separation.

11. The aircraft in accordance with claim 10, further comprising a camera structured and arranged to record the separation.

12. The aircraft in accordance with claim 11, further comprising a device for correlating successive images from the camera image with the timing unit.

13. The aircraft in accordance with claim 12, wherein the correlating device is structured and arranged to identify a camera image captured at the time at which the minimum distance is achieved.

14. The aircraft in accordance with claim 13, wherein the minimum distance is determinable from the camera image captured at the time at which the minimum distance is achieved.

15. A method for determining a minimum distance between at least two stores located on a fuselage or wings of an aircraft, the method comprising:
    positioning at least one magnetic field sensor to monitor a distance between the at least two stores;
    separating one of the at least two stores from the fuselage or wings, whereby the one of the at least two stores moves relative to an other of the at least two stores; and
    determining with the at least one magnetic field sensor a minimum distance occurring between the one store and the other store during the release of the one store.

16. The method in accordance with claim 15, wherein the determining comprises monitoring a chronological course of the distance during the release.

17. The method in accordance with claim 15, further comprising positioning at least one magnet on the one of the stores.

18. The method in accordance with claim 17, wherein the positioning of the at least one magnetic field sensor comprises locating the at least one magnetic field sensor on the other external store.

19. The method in accordance with claim 18, further comprising directing a camera at a location at which the minimum distance is anticipated;
    recording images of the location at which the minimum distance is anticipated; and
    identifying an image recorded at a time at which the magnetic field sensor determines the occurrence of the minimum distance.

* * * * *